July 31, 1962  E. G. FRIDRICH  3,047,052
APPARATUS FOR LAMINATING AN ELECTROLUMINESCENT CELL LAY-UP
Filed July 14, 1958  3 Sheets-Sheet 3
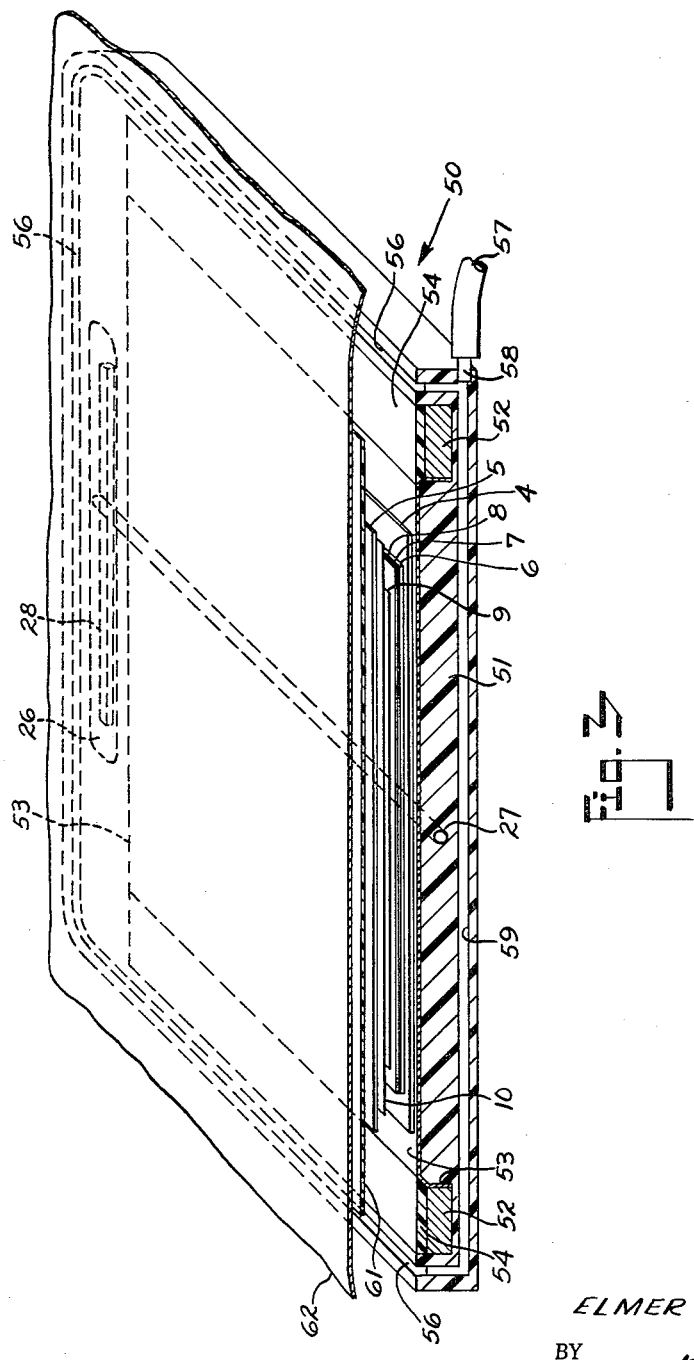
INVENTOR.
ELMER G. FRIDRICH
BY
HIS ATTORNEY

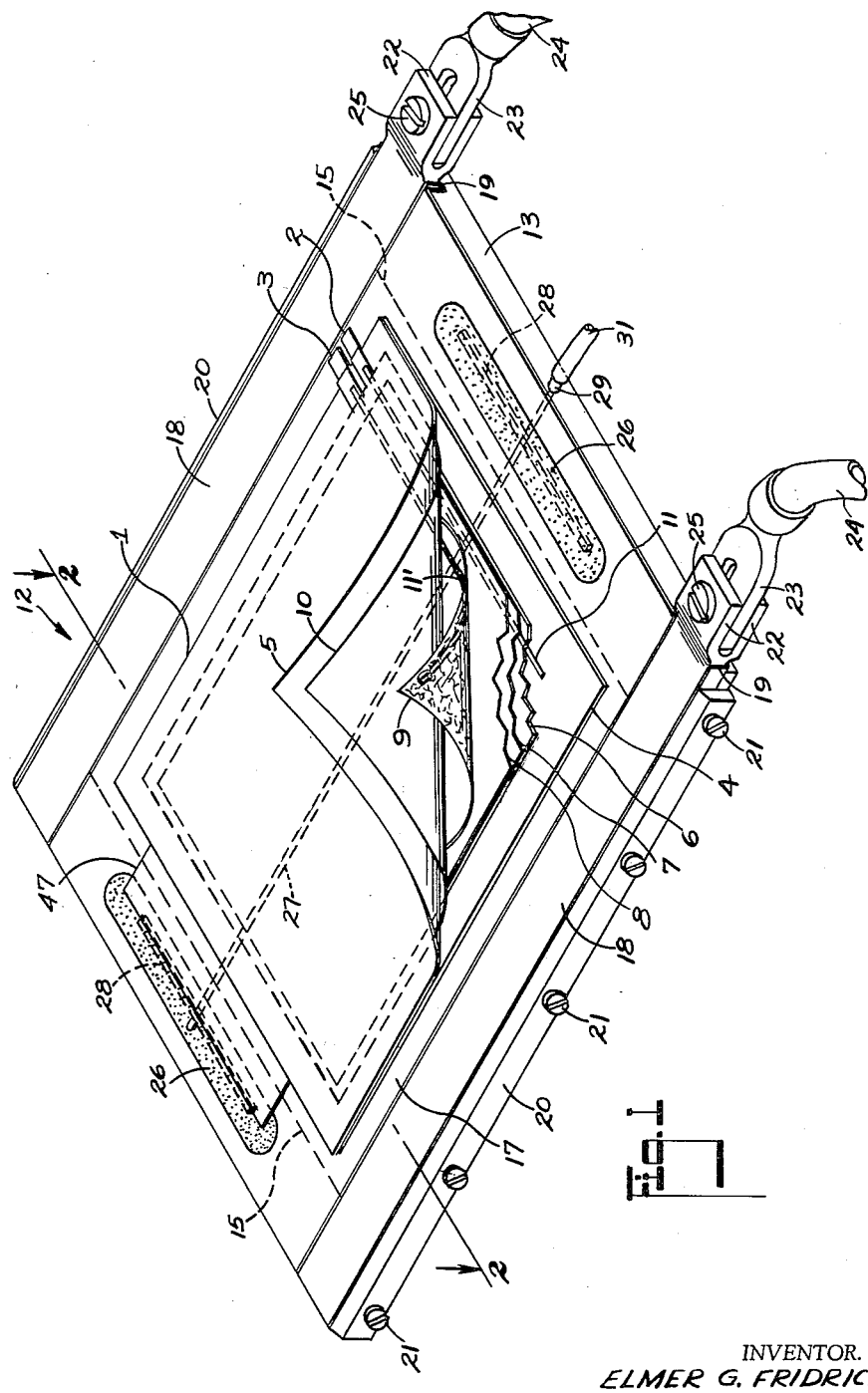
INVENTOR.
ELMER G. FRIDRICH
BY
HIS ATTORNEY

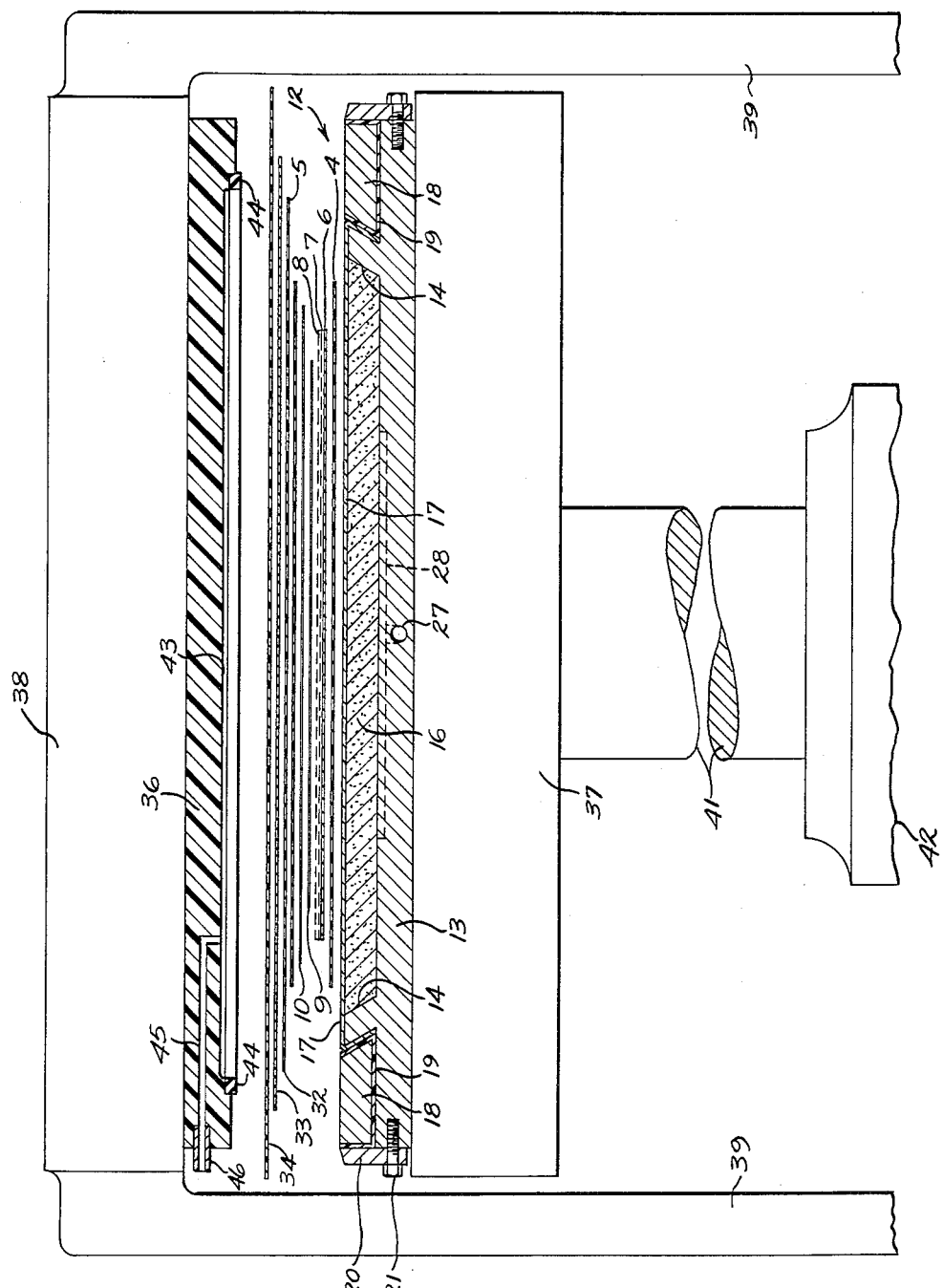

United States Patent Office 3,047,052
Patented July 31, 1962

3,047,052
APPARATUS FOR LAMINATING AN ELECTROLUMINESCENT CELL LAY-UP
Elmer G. Fridrich, Cleveland Heights, Ohio, assignor to General Electric Company, a corporation of New York
Filed July 14, 1958, Ser. No. 748,537
4 Claims. (Cl. 156—580)

This invention relates in general to flexible laminated electroluminescent lamps or cells and more particularly to a process and equipment used in their manufacture.

Although not specifically limited thereto in its application, the present invention is more particularly concerned with the type of electroluminescent lamp described and claimed in copending application Serial No. 701,906 of Elmer G. Fridrich and Paul A. Dell, filed December 10, 1957, entitled Electroluminescent Lamp and Manufacture Thereof and assigned to the same assignee as the present invention, now Patent 2,945,976. That lamp comprises a flexible laminated assembly of electrically active layers encased in a thin envelope of thermoplastic material which is evacuated and heat-sealed around the edges. The electrically active elements comprise an aluminum foil coated with a layer of high dielectric constant material which in turn is overcoated with a layer of electroluminescent phosphor and finally overlaid with a sheet of conducting glass paper. The aluminum foil and the conducting glass paper form the electrodes of the lamp to which an alternating potential is applied and light is emitted through the glass paper and plastic envelope.

The electroluminescent lamp of the aforementioned Fridrich and Dell application is made by the application of hydrostatic pressure to a thin flexible diaphragm such as a metal foil or a plastic sheet laid over the electroluminescent cell lay-up while a vacuum is applied under the diaphragm to purge of gases the laid up components of the cell. The lay-up is placed on a vacuum plate over which is applied a pressure plate and the two are positioned between the platens of a laminating press. The platens are then heated, for instance by means of sheathed electrical resistance elements embedded in them, and the heat is transmitted through the vacuum and pressure plates to the cell lay-up. The lay-up must be cooled before it is removed from the plates and this is done by circulating cooling water or oil through passageways in the faces of the platens. The entire operation takes considerable time, for instance as much as 15 minutes and the electrical energy expended each time to heat the relatively massive platens and plates is substantial.

The object of the invention is to provide a new and improved process for pressure laminating a thin flexible assembly.

A more specific object of the invention is to provide a process which is more rapid and more economical of heat to laminate an electroluminescent cell lay-up.

A further object of the invention is to provide an improved laminating process for electroluminescent lamps permitting a lay-up to be laminated in a few seconds as against the many minutes formerly required and using only a small fraction of the heating energy formerly used.

In accordance with the invention, a thermally insulating vacuum plate receives the electroluminescent cell lay-up and the required heat is provided by passing a heavy electrical current through a thin metal plate or foil which is in intimate contact with the material being laminated. In one technique according to the invention, the electroluminescent assembly is laid-up on a vacuum plate and an aluminum foil is placed over it to bridge the gap between heavy contact strips or bus bars on each side of the plate and serve as an electrical resistance heater. A current in the density range of several thousand amperes per square inch of cross section of aluminum foil is supplied and the desired laminating temperature is achieved in a few seconds.

In a modification of the process embodying the invention, a thin stainless steel heating sheet is provided as a permanent part of the vacuum plate and the current is passed therethrough in order to heat the electroluminescent cell lay-up.

For further objects and advantages and for a detailed description of a preferred process and equipment according to the invention for the manufacture of electroluminescent lamps, attention is now directed to the following description and accompanying drawings. The features of the invention believed to be novel will be more particularly pointed out in the appended claims.

In the drawings:

FIG. 1 is a pictorial view of a flexible laminated electroluminescent lamp laid over a vacuum plate for lamination in accordance with the invention.

FIG. 2 is a vertical sectional view through pressure and vacuum plates positioned between the platens of a hydraulic press and with an expanded lay-up of electroluminescent cell components stacked on the vacuum plate; the view through the lay-up is a section through plane 2—2 in FIG. 1.

FIG. 3 is a pictorial view of a modified vacuum plate forming another embodiment of the invention.

Referring to FIG. 1, the process and equipment in accordance with the invention is intended particularly for the manufacture of the illustrated electroluminescent lamp 1 having one corner delaminated or peeled open to show the constituent layers. The lamp or cell is flat and rectangular and is made up of flexible components laminated together and entirely sealed in plastic material. The lamp is energized by applying an alternating voltage, for instance 118 volt-60 cycle A.C., to the copper screen terminals 2, 3 projecting laterally from the edge of the plastic envelope. The underside and the topside of the lamp envelope consist of sheets 4, 5 of thermoplastic material which flows under heat and pressure and which are welded together along the margins. Suitable thermoplastic materials consist of high density polyethylene film or polytetrafluoroethylene film having a thickness for instance of 0.003 inch.

The electrically active elements comprise a rectangular sheet of metal foil 6, for instance soft annealed aluminum of 0.0008 inch thickness, coated with an insulating layer 7 of high dielectric constant material, the latter overcoated with a light-producing layer 8 of electroluminescent phosphor. Foil 6 is placed over the lowermost polyethylene sheet 4 leaving a clear margin all around. Insulating layer 7 may consist of barium titanate dispersed in an organic polymeric matrix such as cyanoethylcellulose with suitable plasticizers as described and claimed in copending application Serial No. 701,907, filed December 10, 1957 of Mary S. Jaffe, entitled, "High Dielectric Constant Matrices for Electroluminescent Cells" (LD-2835) and assigned to the same assignee as the present invention, now Patent 2,951,865. Electroluminescent layer 8 may consist of any known electroluminescent phosphor such as zinc sulfide-zinc oxide with suitable activators such as copper, manganese, lead or silver, likewise dispersed in an organic polymeric matrix such as cyanoethyl cellulose. A sheet of conducting glass paper 9 is laid over the coated foil leaving a narrow margin of foil uncovered all around. Glass paper sheet 9 may consist of commercially available micro-fiber glass paper made conducting by dipping in a solution of indium basic trifluoroacetate in an organic solvent and baking at an elevated temperature. A thin low-density polyethylene sheet 10 is placed over the conducting glass paper to improve the adherence of the glass paper sheet to the phosphor layer.

Terminals 2, 3 of the cell are connected to the conductive layers consisting of aluminum foil 6 and glass paper 9 by means of flattened flexible copper braids or ribbons 11, 11'. The former is laid between lower envelope sheet 4 and the aluminum foil, and the latter is laid between the glass paper and low-density polyethylene sheet 10. During the laminating process, the copper ribbons become embedded in the thermoplastic sheets and are at the same time pressed against the aluminum foil or the conductive glass paper as the case may be. The ends of the copper ribbons and the copper screen 2, 3 likewise become embedded in the thermoplastic envelope sheets and are pressed in mutual contact.

The laminating process with the improved heating feature in accordance with the invention may be practiced using vacuum plate 12 illustrated pictorially in FIG. 1 and in cross section in FIG. 2. The vacuum plate comprises a generally rectangular base member 13 which may be made of a light metal such as aluminum. The central portion of the base member is provided with a shallow recess between inclined shoulders 14 near the margins, the portions between the shoulders and the outer edges being likewise recessed. The central recess extending between shoulders 14 on two sides and between dotted lines 15 shown in FIG. 1 on the front and rear sides, is filled with a cemented thermally insulating mass 16 which may consist of a mixture of diatomaceous earth, asbestos fibers and cement. Mass 16 is formed with a smooth flat upper surface and provides a thermally insulating support for a thin sheet of polished stainless steel 17 overlying it and having its edges bent around the inclined shoulders 14. In the recesses between the outside edges of inclined shoulders 14 and the margins of base member 13 are positioned heavy copper contact strips or bus bars 18. The bus bars are electrically insulated from base member 13 and from the edges of stainless steel sheet 17 by insulating strips 19 and are locked in place by retaining bars 20 fastened in place by screws 21. The bus bars are provided with slotted ends 22 which accommodate the terminals 23 of heavy current conductors 24, the screws 25 serving to lock the terminals in place.

The front and rear sides of base member 13 are provided with transversely extending recesses in which are accommodated shallow porous stainless steel inserts 26. These inserts are used to vent gas from the electroluminescent cell lay-up during the laminating process. A passageway 27 within base member 13 connects transverse branch channels 28 underlying the porous inserts with a fitting 29 to which is connected a flexible tube 31 for the application of vacuum to the vacuum plate.

In assembling the electroluminescent cell lay-up preparatory to laminating, the vacuum plate 12 is preferably laid flat on a suitable work bench as illustrated in FIG. 1. The various layers of the cell are then positioned centrally on the vacuum plate over stainless steel sheet 17 as illustrated in FIG. 2. The order of assembly is as follows: sheet 4 of high-density polyethylene, then aluminum foil 6 coated with the insulating and phosphor layers, then conducting glass paper sheet 9, then low-density polyethylene sheet 10, and finally high-density polyethylene sheet 5. The vertical height or thickness of the cell components shown in FIG. 2 are greatly exaggerated for purposes of illustration. The copper ribbon connectors 11, 11' and copper screen terminals 2, 3 (not shown in FIG. 2) are also inserted in place.

There is no minimum size to the electroluminescent cell assembly but there is a maximum size determined by the dimensions of the vacuum plate. No part of the assembly may extend to the portions of stainless steel sheet 17 lying beyond thermal insulating mass 16 because there will not be sufficient heat developed in such portions to effectively laminate the plastic components. The electroluminescent cell lay-up is covered with an electrically insulating sheet 32 which may suitably consist of polyethylene terephthalate film known as Mylar. Sheet 32 overreaches the front and rear edges of stainless steel sheet 17 and overlaps slightly the inside edges of copper bus bar 18. An electrically conducting sheet 33, which may conveniently be a sheet of soft annealed aluminum 0.001 inch thick, is placed over insulating sheet 32 and reaches beyond its edges to overlie copper bus bars 18. Finally an electrically non-conductive impervious sheet 34 which serves as a conformable diaphragm is placed over aluminum sheet 33 and preferably overlaps the vacuum plate on all sides.

A pressure plate 36 is now applied over vacuum plate 12 and the two are positioned between the pressure platens 37, 38 of a laminating press. The pressure plate may be made of a dimensionally stable thermosetting plastic, or of metal in which case sheet 34 serves to insulate aluminum sheet 33 therefrom. The upper platen is restrained by side rods 39 and the lower platen is driven upward by piston 41 working in a conventional hydraulic cylinder 42. It is immaterial whether the vacuum plate is positioned lowermost as illustrated in FIG. 2, or uppermost. The lower surface of pressure plate 36 is machined out to form a shallow depression 43 which is surrounded by a rubber sealing gasket 44. A radial hole 45 communicates with shallow depression 43 and is provided with a fitting 46 for the application of pressurized gas to the cavity formed between the pressure plate and conformable diaphragm sheet 34. The depth of the shallow depression is not important so long as it be great enough to accommodate the thickest electroluminescent cell lay-up required to be laminated. The surface of shallow depression 43 in the pressure plate does not engage the surface of the conformable diaphragm 34, the actual pressure against the diaphragm being exerted by the pressurized gas admitted into the cavity. Compressible gasket 44 in the pressure plate effects a seal between conformable diaphragm 34 and the vacuum plate. Vacuum is applied under the conformable diaphragm through fitting 29 and tube 31, and gases or moisture trapped therein or released under heat lamination are vented through the porous stainless steel inserts 26. To assist in venting such gases, small pieces 47 of porous paper, for instance lens wiping tissue, may be positioned under sheet 32 between the front and rear edges of the electroluminescent lay-up and reaching over to the porous inserts 26 (only the rear piece is illustrated in FIG. 1).

With pressure applied above conformable diaphragm sheet 34 and vacuum below, the lay-up is now ready to be heat laminated. In accordance with the invention, the lay-up is heated by passing current at high density through aluminum sheet 33, the current flow being from one copper bus bar 18 to the other. For a conducting sheet 33 of aluminum, the current density may be in the region of 100,000 amperes per square inch. For aluminum foil of one mil thickness, the current may be approximately 100 amperes per lineal inch of foil measured along the length of the copper bus bars. This corresponds to a heat input of approximately 31 watts per square inch of cell. In a square cell 8 inches on a side, a total current of 800 amperes developing across the foil a voltage drop of approximately 2.5 volts will provide a total heat input of 2000 watts. This heat input for a period of approximately 7 to 15 seconds will provide in the cell lay-up a laminating temperature of approximately 200° C., sufficient for laminating polytetrafluoroethylene. A lesser time interval or a lower current may be used to develop a temperature of approximately 150° C. for laminating polyethylene.

The relatively low wattage input and short heating time required results from the fact that the aluminum foil is in intimate contact with the material being laminated and the thermal mass of the materials required to be heated is relatively low. The upper conformable diaphragm of Mylar is not in contact with pressure plate 36 so that there is little loss of heat thereto. Stainless steel sheet 17 must of course be heated to the desired temperature but it has a relatively low thermal mass and there is little loss of heat therefrom since it is resting on the thermally insulating mass 16 of diatomaceous earth. The fact that the heating is done rapidly also reduces loss of heat by conduction or radiation. In addition to the saving in time and reduction in heat or electrical energy which the invention achieves, there is also an improvement in quality in that electroluminescent cells made by the instant process are virtually free of the degrading effects that a prolonged heat cycle have on the phosphor, the transparent conducting film and the thermoplastic encapsulating material.

The process provides not only a fast warm-up but also a short cooling time, for instance about 15 seconds, due to the low heat storage in the electroluminescent lamp. A conventional laminating cycle for polytetrafluoroethylene lamination using electrically heated press platens and water cooling as formerly done, required by comparison from 30 to 60 minutes.

The process of the invention may be carried out in modified form using the equipment illustrated in FIG. 3. Vacuum plate 50 shown therein in a sectioned pictorial view comprises a generally rectangular plate 51 of thermally and electrically insulating material of good dimensional stability such as a molded laminated phenolic compound. Copper bus bars 52 are buried in slots formed near the side margins of the plate and a thin sheet 53 of stainless steel extends over the central portion of the plate from one bus bar to the other. The edges of the sheet are turned down into the channels so as to be in pressure contact with the sides of the copper bus bars. The copper bus bars are cemented in place and covered over with tongues 54 of the same insulating material as the vacuum plate so that the upper surface of the vacuum plate is uniformly flat. Porous stainless steel inserts 26 may be provided at the ends of the vacuum plate for evacuation of gases from the electroluminescent cell lay-up. Vacuum may be applied therethrough in the same manner as previously described through passageway 27 and branch channels 28. To aid in holding down the conformable diaphragm on the vacuum plate, a narrow groove 56 is provided running around the edge of the vacuum plate and to which secondary vacuum may be applied through tube 57 and fitting 58 communicating with passageway 59 leading into the groove at various points.

The electroluminescent cell lay-up is positioned in the usual manner on stainless steel sheet 53, that is first high density polyethylene sheet 4, next aluminum foil 6 coated with the insulating layer 7 and phosphor layer 8, then conducting glass paper sheet 9, then low density polyethylene sheet 10, and finally high density polyethylene sheet 5. An electrically insulating sheet 61, of Mylar for instance and of sufficient size to overreach completely stainless steel sheet 53, is then placed over the electroluminescent cell lay-up. A conformable diaphragm 62, preferably of pinhole free aluminum foil, is now placed over sheet 61 and overreaches the edges of the vacuum plate all around. The two sheets 61 and 62 assure a more impermeable composite diaphragm because of the staggering of any pinholes that might be present in either sheet. The secondary vacuum applied to groove 58 helps to hold diaphragm sheet 62 down on the vacuum plate. A pressure plate is now applied over the vacuum plate similar to that which has been described with reference to FIG. 2, and the vacuum and pressure plates are positioned between the platens of a hydraulic press in the same fashion.

When using vacuum plate 50, current is passed through stainless steel sheet 53 to heat the electroluminescent cell lay-up. Since the stainless steel sheet is a permanent part of the vacuum plate, greater uniformity and consistency in results may be obtained. Also the provision of insulating Mylar sheet 61 allows conformable diaphragm 62 to be an aluminum foil which does not interfere electrically with the operation of the stainless steel sheet. It has been found that aluminum foil is more impermeable than plastic films such as Mylar and therefore more suitable for use as a conformable diaphragm. Also the laminating process used with the vacuum plate of FIG. 3 requires the use of only two expendable sheets, that is one Mylar sheet and one aluminum foil, as against the three sheets required with the vacuum plate of FIGS. 2 using two Mylar sheets and one aluminum foil.

While specific details of a process for producing an electroluminescent cell along with preferred equipments for practicing the process have been described in detail, the same are intended as illustrative and not in order to limit the invention thereto. The scope of the invention is to be determined by the appended claims.

What I claim as new and desire to secure by Letters Patent of the United States is:

1. Apparatus for laminating an electroluminescent cell lay-up of the kind comprising outer thermoplastic sheets enclosing and overreaching inner electrically active components including a metal foil coated with an electroluminescent phosphor having positioned thereagainst a sheet of conducting glass paper, comprising a vacuum plate having a central thermally insulating portion for positioning said lay-up thereupon, a porous portion in said vacuum plate, a pair of heavy bus bars embedded in said vacuum plate on either side of said thermally insulating portion, said bus bars being electrically insulated from said vacuum plate, an electrically insulating sheet laid over said lay-up and overlapping the inside edges of said bus bars, an electrically conductive sheet laid over said insulating sheet and overlying said bus bars, an impermeable conformable diaphragm applied over said vacuum plate to cover the electroluminescent lay-up and overreaching a porous portion in said plate, a pressure plate fitting over said vacuum plate and adapted to make a hermetic seal with said diaphragm, said pressure plate having a cavity therein for accommodating said lay-up, means for clamping the vacuum and pressure plates together, means for applying a vacuum under the conformable diaphragm through said porous portion, means for applying hydrostatic pressure between the pressure plate and conformable diaphragm, and connections for supplying electric current to said bus bars in order to pass current at high density through said conductive sheet for heating said lay-up.

2. A vacuum plate for laminating an electro-luminescent cell lay-up of the kind comprising outer thermoplastic sheets enclosing and overreaching inner electrically active components comprising a flat plate having a shallow central recess filled with a thermally insulating mass, a smooth metal sheet covering said thermally insulating mass, a pair of heavy bus bars embedded in said plate on either side of said thermally insulating mass and insulated from said plate and from said metal sheet, porous inserts embedded in said plate beyond the limits of said thermally insulating mass and having their upper surfaces generally flush with the upper surface of said smooth metal sheet, means for applying vacuum to said porous inserts, and electrical connections for supplying current to said bus bars.

3. A vacuum plate for laminating an electroluminescent cell lay-up of the kind comprising outer thermoplastic sheets enclosing and overreaching inner electrically active components comprising a flat plate of thermally and electrically insulating material, a pair of bus bars embedded in said plate near the sides thereof, a smooth metal sheet covering the central portion of said plate and extending into engagement with said bus bars, porous inserts in said plate beyond the limits of said metal sheet extending from one bus bar to the other, means for applying vacuum to said porous portions, and electrical connections for supplying current to said bus bars in order to heat said metal sheet by current flow at high density therethrough.

4. Apparatus for laminating a lay-up of thermoplastic sheets together, comprising a vacuum plate having a central thermally insulating portion for placing said lay-up thereupon, a pair of electrically insulated bus bars on either side of said thermally insulating portion, an electrically conductive sheet extending between said bus bars, an impermeable conformable diaphragm applied over said vacuum plate and overreaching the electroluminescent lay-up, a pressure plate fitting over said vacuum plate and adapted to make a hermetic seal with said diaphragm, said pressure plate having a cavity therein for accommodating said lay-up, means for clamping the vacuum and pressure plates together, means for applying a vacuum under said conformable diaphragm, means for applying hydrostatic pressure between the pressure plate and conformable diaphragm, and connections for supplying electric current to said bus bars in order to pass current at high density through said conductive sheets for rapidly heating said lay-up.

References Cited in the file of this patent

UNITED STATES PATENTS

| | | |
|---|---|---|
| 1,980,022 | Whitehouse | Nov. 6, 1934 |
| 2,441,097 | Hicks | May 4, 1948 |
| 2,714,567 | Cravener | Aug. 2, 1955 |
| 2,774,004 | Jaffe | Dec. 11, 1956 |
| 2,794,104 | Nathan | May 28, 1957 |
| 2,841,823 | Van Hartesveldt | July 8, 1958 |
| 2,859,796 | Taunton | Nov. 11, 1958 |